US010613768B2

(12) United States Patent
Doering

(10) Patent No.: US 10,613,768 B2
(45) Date of Patent: Apr. 7, 2020

(54) CHECKPOINTING MODULE AND METHOD FOR STORING CHECKPOINTS

(71) Applicant: International Business Machines Corporation, Armonk, NY (US)

(72) Inventor: Andreas Christian Doering, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 30 days.

(21) Appl. No.: 14/973,008

(22) Filed: Dec. 17, 2015

(65) Prior Publication Data

US 2016/0179425 A1 Jun. 23, 2016

(30) Foreign Application Priority Data

Dec. 17, 2014 (GB) .................................. 1422436.4

(51) Int. Cl.
G06F 12/00 (2006.01)
G06F 12/08 (2016.01)
G06F 13/00 (2006.01)
G06F 3/06 (2006.01)
G06F 11/14 (2006.01)
G06F 11/20 (2006.01)
G06F 12/02 (2006.01)

(52) U.S. Cl.
CPC ............ G06F 3/0619 (2013.01); G06F 3/065 (2013.01); G06F 3/0688 (2013.01); G06F 11/14 (2013.01); G06F 11/20 (2013.01); G06F 12/0246 (2013.01); G06F 2212/401 (2013.01)

(58) Field of Classification Search
CPC ......... G06F 3/0619; G06F 3/065; G06F 12/00

USPC ......................................................... 711/103
See application file for complete search history.

(56) References Cited

U.S. PATENT DOCUMENTS 7,478,278 B2 * 1/2009 Archer ................ G06F 11/1438
714/15
9,411,628 B2 * 8/2016 Bezbaruah .......... G06F 9/45558
9,424,142 B2 * 8/2016 Ljubuncic ........... G06F 11/1469
9,652,568 B1 * 5/2017 Tzelnic ............... G06F 17/5022
(Continued)

FOREIGN PATENT DOCUMENTS

WO WO 2013101038 A1 * 7/2013 ............. G11C 5/025

OTHER PUBLICATIONS

Luijten, R.P., et al. "The Dome Embedded 64 Bit Microserver Demonstrator", 2013 International Conference on IC Design and Technology, May 29-31, 2013, pp. 1-4.
(Continued)

Primary Examiner — Mohamed M Gebril
(74) Attorney, Agent, or Firm — Fleit Intellectual Property Law; Thomas S. Grzesik

(57) ABSTRACT

A checkpointing module, a method for storing checkpoints and a microserver including a checkpointing module for storing checkpoints are proposed. The checkpointing module includes an interconnect interface configured to receive checkpoints from at least one compute module, one or more non-volatile random access memory devices configured to store the received checkpoints, a memory management entity configured to assign storage locations for the received checkpoints in the one or more non-volatile random access memory devices, and a memory controller configured to store the received checkpoints at the assigned storage locations.

20 Claims, 6 Drawing Sheets

(56) References Cited

U.S. PATENT DOCUMENTS

| | | | | |
|---|---|---|---|---|
| 9,671,971 | B2* | 6/2017 | Trika | G06F 3/0638 |
| 2006/0047925 | A1* | 3/2006 | Perry | G06F 11/1474 |
| | | | | 711/162 |
| 2006/0236152 | A1* | 10/2006 | Archer | G06F 11/1438 |
| | | | | 714/16 |
| 2008/0162599 | A1* | 7/2008 | Mittal | G06F 11/1451 |
| 2008/0201414 | A1* | 8/2008 | Amir Husain | G06F 9/445 |
| | | | | 709/203 |
| 2009/0094445 | A1* | 4/2009 | Brandyberry | G06F 9/4856 |
| | | | | 712/233 |
| 2011/0113208 | A1* | 5/2011 | Jouppi | G06F 11/1438 |
| | | | | 711/162 |
| 2011/0167196 | A1* | 7/2011 | Scales | G06F 11/1438 |
| | | | | 711/6 |
| 2012/0079174 | A1* | 3/2012 | Nellans | G06F 12/0246 |
| | | | | 711/103 |
| 2012/0079221 | A1* | 3/2012 | Sivasubramanian | |
| | | | | G06F 11/1456 |
| | | | | 711/162 |
| 2013/0042153 | A1* | 2/2013 | McNeeney | G06F 11/366 |
| | | | | 714/38.1 |
| 2013/0311754 | A1* | 11/2013 | Brown | G06F 9/30072 |
| | | | | 712/216 |
| 2013/0311992 | A1* | 11/2013 | Fuente | G06F 11/1484 |
| | | | | 718/1 |
| 2013/0332660 | A1* | 12/2013 | Talagala | G06F 12/0246 |
| | | | | 711/103 |
| 2014/0108709 | A1* | 4/2014 | Barrall | G06F 16/1873 |
| | | | | 711/103 |
| 2014/0214770 | A1* | 7/2014 | Kannan | G06F 11/1438 |
| | | | | 707/649 |
| 2015/0169238 | A1* | 6/2015 | Lee | G06F 12/0871 |
| | | | | 711/103 |

OTHER PUBLICATIONS

Hou, K.Y., et al., "Tradeoffs in Compressing Virtual Machine Checkpoints", Proceedings of the 7th International Workshop on Virtualization Technologies in Distributed Computing, Jun. 18, 2013, pp. 1-8.

Ameen, D.A., "Onyx: A Phase-Change Memory Storage Array", A thesis submitted in partial satisfaction of the requirements for the degree Master of Science in Computer Science, 2011, pp. 1-42.

* cited by examiner

CHECKPOINTING MODULE AND METHOD FOR STORING CHECKPOINTS

CROSS-REFERENCE TO RELATED APPLICATION

This application is based upon and claims priority from prior United Kingdom patent application number 1422436.4, filed Dec. 17, 2014, the entire contents of which are hereby incorporated by reference herein.

FIELD OF THE INVENTION

The present invention relates to a checkpointing module for storing checkpoints, to a method for storing checkpoints and to a microserver including a checkpointing module for storing checkpoints.

BACKGROUND

The paradigm of parallel computing is nowadays based on large numbers of networked physical servers, which are adapted to commission, execute, and decommission virtual servers (or virtual machines) in parallel and independently of each other.

With an advancing use of physical server components originally developed for consumer or embedded products, a lack of built-in functionality for fault detection and recovery arises, ultimately resulting in a significantly lower dependability of such physical servers in comparison with their predecessors.

In presence of a more failure-prone physical server infrastructure, techniques such as checkpointing may be taken advantage of for maintaining availability of the executed virtual machines or processes.

Checkpointing is about proactive and frequent acquisition of snapshots (or checkpoints) of virtual machines or compute processes to enable their immediate continuation upon a failure of the underlying physical servers.

Despite being a well-known technique, checkpointing in parallel computing systems suffers from several factors. For example, when large numbers of physical servers with multiple processor cores per each are deployed, the sheer number of accruing checkpoints may require limiting the frequency in which checkpoints are acquired or renewed. This results in a longer mean time to repair (MTTR), which is a crucial factor in the calculation of the system availability.

The same may apply when block storage devices such as hard disks (HDD), solid-state disks (SSD) or Flash memory are used to store the accruing checkpoints, because of the limiting factor of extensive access latencies. In this context, however, the processing of accruing checkpoints may also become the critical bottleneck.

In reference [1], a physical server infrastructure for parallel computing based on a microserver concept is described, wherein a microserver is defined to integrate all integrated digital circuits of a server motherboard in a single System on a Chip (SoC), excluding volatile random access memory (RAM), boot flash memory and power converters, but including the networking interface.

The use of compression techniques in virtual machine checkpointing is disclosed in reference [2], in particular in relation to a proposed technique, which takes advantage of checkpoint similarity.

In reference [3], checkpointing is applied to inter-process communication to enhance fault tolerance in distributed systems.

Phase-change memory (PCM) technology as a basis for high-performance SSDs is proposed in reference [4].

Accordingly, it is an aspect of the present invention to improve storing checkpoints.

BRIEF SUMMARY OF THE INVENTION

According to a first aspect, a checkpointing module for storing checkpoints is proposed. The checkpointing module comprises an interconnect interface which is configured to receive checkpoints from at least one compute module, a number of non-volatile random access memory devices which are configured to store the received checkpoints, a memory management entity which is configured to assign storage locations for the received checkpoints in the number of non-volatile random access memory devices, and a memory controller which is configured to store the received checkpoints at the assigned storage locations.

In an embodiment, the non-volatile random access memory device includes a phase change memory cell or a memristor cell.

In a further embodiment, the checkpointing module includes a source coding entity, which is configured to perform source coding of the received checkpoints.

In a further embodiment, the source coding entity is configured to perform data differencing.

In a further embodiment, upon presence of reference checkpoints for the received checkpoints, the source coding entity is configured to perform data differencing between the received checkpoints and the reference checkpoints.

In a further embodiment, the source coding entity is configured to perform data compression.

In a further embodiment, upon absence of reference checkpoints for the received checkpoints, the source coding entity is configured to perform data compression of the received checkpoints.

In a further embodiment, the checkpointing module includes a number of volatile random access memory devices, wherein the memory management entity is further configured to assign temporary storage locations for the received checkpoints in the number of volatile random access memory devices.

In a further embodiment, the checkpointing module includes a short-term energy supply, which is configured to supply, upon a power outage, energy for a transfer of any stored checkpoints from the number of volatile random access memory devices to the number of non-volatile random access memory devices.

In a further embodiment, the checkpointing module includes a power management entity, which is configured to disable the source coding of a subset of the received checkpoints upon a power outage.

In a further embodiment, the interconnect interface is further configured to receive a request for a stored checkpoint from the at least one compute module, wherein the memory management entity is further configured to look up the assigned storage location of the stored checkpoint for which the request is received, wherein the memory controller is further configured to retrieve the stored checkpoint from its assigned storage location, and wherein the interconnect interface is configured to deliver the stored checkpoint to the at least one compute module.

In a further embodiment, the checkpointing module includes an external storage interface, which is configured to page in and out stored checkpoints to and from block access storage.

In a further embodiment, the memory controller is further configured to overwrite stored checkpoints at their assigned storage locations with more recently received checkpoints from the at least one compute module.

Any embodiment of the first aspect may be combined with any embodiment of the first aspect to obtain another embodiment of the first aspect.

According to a second aspect, a microserver is proposed. The microserver comprises a base node including a plurality of module slots for receiving different modules, at least one compute module for providing checkpoints, and at least one checkpointing module for storing checkpoints according to the above-mentioned first aspect.

According to a third aspect, a method for storing checkpoints is proposed. The method comprises the following steps: In a first step, checkpoints from at least one compute module are received. In a second step, a number of non-volatile random access memory devices are provided which is configured to store the received checkpoints. In a third step, storage locations are assigned for the received checkpoints in the number of non-volatile random access memory devices. In a fourth step, the received checkpoints are stored at the assigned storage locations.

According to a fourth aspect, the invention relates to a computer program comprising a program code for executing the method of the third aspect for storing checkpoints when run on at least one computing device.

In the following, exemplary embodiments of the present invention are described with reference to the enclosed figures.

BRIEF DESCRIPTION OF THE DRAWINGS

Similar or functionally similar elements in the figures have been allocated the same reference signs if not otherwise indicated.

DETAILED DESCRIPTION OF THE EMBODIMENTS

Figure 1:
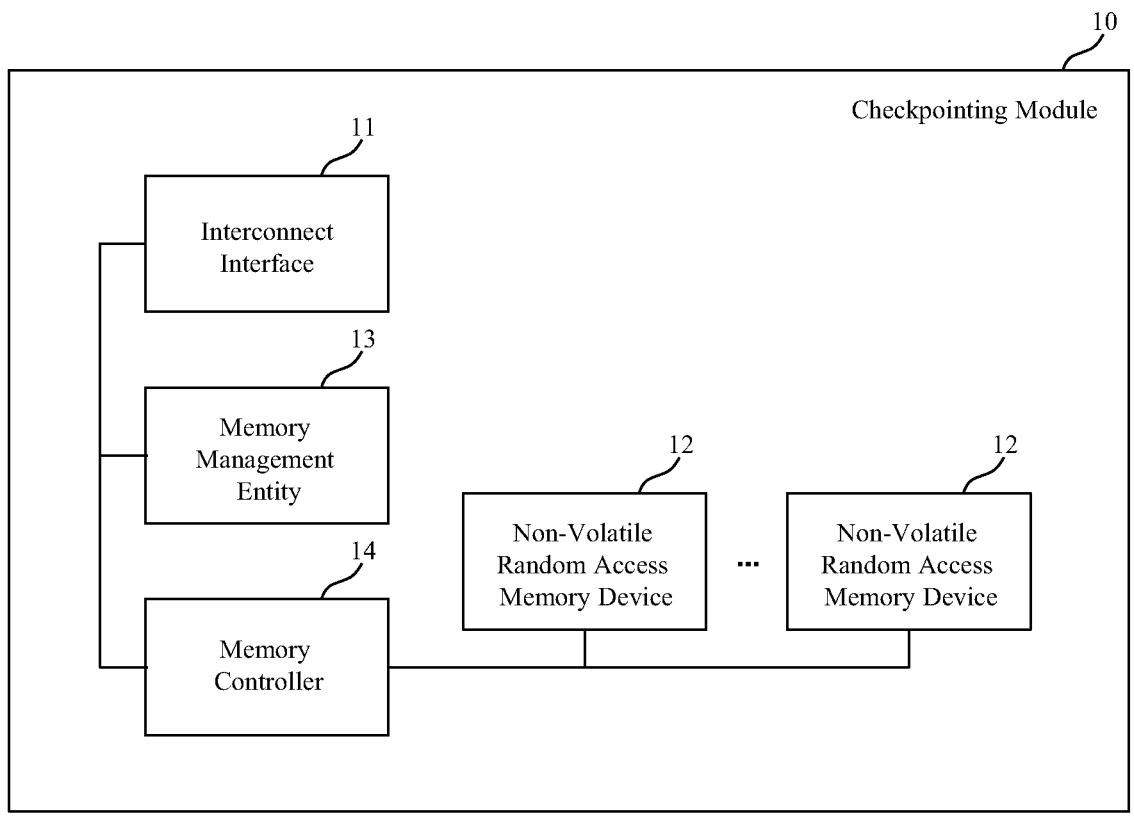
FIG. 1 shows a schematic block diagram of a first embodiment of a checkpointing module for storing checkpoints.

FIG. 1 shows a schematic block diagram of a first embodiment of a checkpointing module 10 for storing checkpoints.

Figure 5:
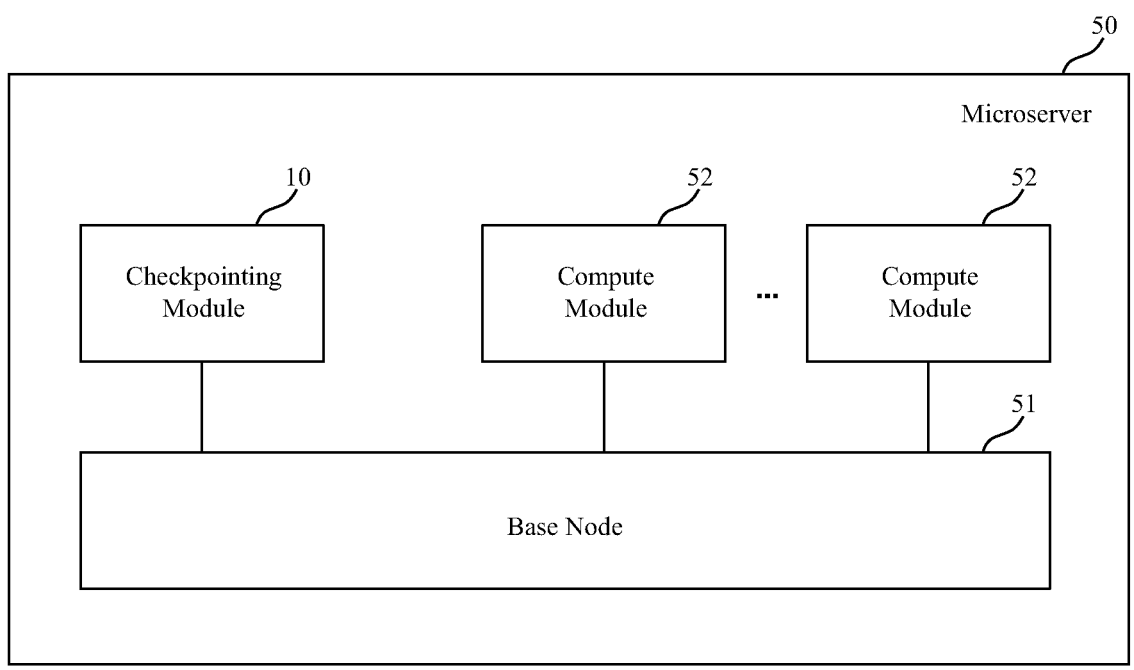
FIG. 5 shows a schematic block diagram of an embodiment of a microserver including a checkpointing module for storing checkpoints.

The checkpointing module 10 comprises an interconnect interface 11 which is configured to receive checkpoints from at least one compute module 52 (see FIG. 5).

The interconnect interface 11 is adapted to provide the checkpointing module 10 with network connectivity to the at least one compute module 52 of FIG. 5. The interconnect interface 11 may be based on networking standards such as Gigabit Ethernet or 10 Gigabit Ethernet.

A checkpoint may comprise a consistent data set describing the software state of a virtual machine or compute process of the at least one compute module 52.

Moreover, the checkpointing module 10 of FIG. 1 comprises a number of non-volatile random access memory devices 12, which are configured to store the received checkpoints.

Random access memory (RAM) is a type of solid-state computer memory, e.g. taking the form of an integrated circuit, which is adapted to store and retrieve individual data words in about constant time regardless of the memory location being addressed or accessed. Particularly, non-volatile RAM (NVRAM) retains its information when power is turned off.

The checkpointing module 10 further comprises a memory management entity 13, which is configured to assign storage locations for the received checkpoints in the number of non-volatile random access memory devices 12.

The memory management entity 13 may be adapted to perform record keeping of the available and allocated portions of the computer memory, in particular RAM, and allocation and deallocation of portions thereof.

The memory management entity 13 may be implemented in hardware and/or in software. If said entity is implemented in hardware, it may be embodied as a device, e.g. as a processor or as a part of a system or subsystem, e.g. a pluggable card or module. If said entity is implemented in software, it may be embodied as a computer program product, as a function, as a routine, as a program code or as an executable object.

The checkpointing module 10 further comprises a memory controller 14, which is configured to store the received checkpoints at the assigned storage locations.

In particular, the memory controller 14 is an integrated circuit, which is in charge of accessing the RAM on behalf of other functional entities of the checkpointing module 10. For example, a processor or an input/output controller, such as an external storage interface 19 of FIG. 2, with direct memory access (DMA) capability may approach the memory controller 14.

The memory controller 14 is adapted to unify the management of multiple non-volatile RAM devices 12 by integrating those in a uniform address space. For example, if an assigned storage location resides in between addresses A and Z, all the words from A to Z (including A, but not including Z) are successively written to by sequentially presenting the respective addresses and the values to be stored at those addresses to the memory controller 14. Depending on the size and position of the assigned storage location within the address space, one or more RAM devices 12 may be written to. Retrieval of values stored in an assigned storage location may take place by sequentially presenting the respective addresses to the memory controller 14.

Advantageously, the checkpointing module 10 is adapted to establish and maintain high availability of virtual machines or compute processes in physical server infrastructures with lots of compute modules 52 of FIG. 5, which may component-wise be based on consumer or embedded parts.

Further, the checkpointing module 10 specializes in storing checkpoints, which relieves other module types such as compute modules 52 of FIG. 5 from doing so on their own behalf. Hence, the checkpointing module 10 contributes to a functional split between different types of modules 10, 52, which enables selective functional modifications via substitution of individual modules 10, 52.

Preferably, the non-volatile random access memory device 12 includes a phase change memory cell or a memristor cell.

In particular, phase change memory (PCM) is a type of non-volatile RAM based on an extraordinary variation in electrical resistance of certain solids like chalcogenide glass, when changing between their crystalline and amorphous solid states.

In particular, memristors represent a class of electrical components, which exhibit, in essence, a charge-dependent electrical resistance. In other words, changing the charge may cause a variation in electrical resistance, similar to PCM.

Advantageously, PCM or memristor-based memory cells may be used to create non-volatile RAM devices 12, which are adapted to reduce access latencies in comparison with conventional flash memory, for example.

Figure 2:
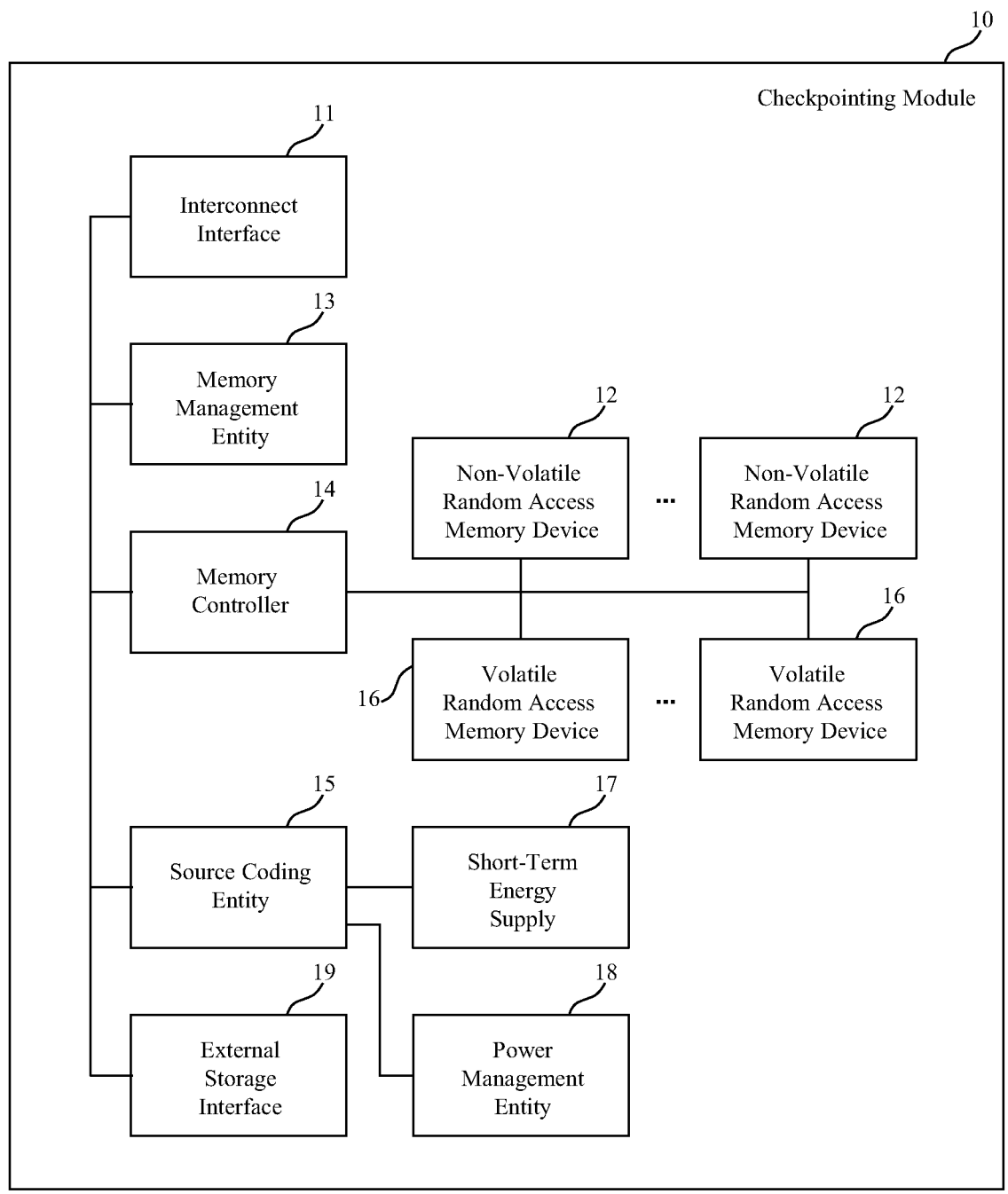
FIG. 2 shows a schematic block diagram of a second embodiment of a checkpointing module for storing checkpoints.

FIG. 2 shows a schematic block diagram of a second embodiment of a checkpointing module 10 for storing checkpoints.

The second embodiment of FIG. 2 includes all the entities of the first embodiment of FIG. 1, and further comprises a source coding entity 15, which is configured to perform source coding of the received checkpoints.

Source coding represents data more concisely by eliminating redundant information in a given data set. In particular, lossless source coding ensures that the eliminated redundant information can be reconstructed accurately.

Advantageously, source coding may effectively reduce the amount of data to be stored, transmitted, and managed, which may relieve respective bottlenecks in a system of FIG. 5 deploying at least one checkpointing module 10. In particular, a trade-off between this reduction and the additional consumption of energy and chip area is to be taken into account.

The source coding entity 15 may be realized in software and/or in hardware, e.g. as field-programmable gate array (FPGA) or as an application specific IC (ASIC) such as an off-the shelf coprocessor, the latter particularly in case of standards-based source coding methods.

Preferably, the source coding entity 15 is configured to perform data differencing.

Advantageously, data differencing, also known as differential compression, may eliminate redundant information in a given data set by determining its difference to a reference data set, so that the original data set may be reconstructed by patching the reference data set with that difference.

In particular, data differencing may be an efficient source coding approach if a reference data set can be or is provided to which, upon differencing, relatively small differences arise.

Preferably, upon presence of reference checkpoints for the received checkpoints, the source coding entity 15 is configured to perform data differencing between the received checkpoints and the reference checkpoints.

Advantageously, data differencing is a source coding approach for special cases where, with respect to a given reference checkpoint, data differencing results in a small difference to be stored.

Moreover, the source coding entity 15 may be configured to perform data compression.

Advantageously, data compression may eliminate redundant information in a given data set by exploiting statistical redundancy and appropriate encoding, so that the original data set may be reconstructed via re-introducing the redundant information as derived from the encoding. In particular, the encoding generally attempts to have recurring data encoded with less bits.

Preferably, upon absence of reference checkpoints for the received checkpoints, the source coding entity 15 is configured to perform data compression of the received checkpoints.

Advantageously, data compression is a default or fallback source coding approach if no meaningful reference data set is or can be provided against which a small difference would remain after data differencing.

Preferably, the checkpointing module 10 further comprises a number N of volatile random access memory devices 16 with N≥1, wherein the memory management entity 13 is further configured to assign temporary storage locations for the received checkpoints in the number of volatile random access memory devices 16.

Random access memory (RAM) thus may include non-volatile RAM devices 12 and/or volatile RAM devices 16. Particularly, the memory controller 14 is adapted to unify the management of multiple types of RAM devices 12, 16 by integrating those in a uniform address space.

Advantageously, when given volatile RAM devices 16, the more expensive non-volatile RAM devices 12 may be reserved for storage of checkpoints, whereas the less expensive volatile RAM devices 16 may be used for caching of received checkpoints until they can be stored in the non-volatile RAM devices 12, for example after being source coded, or after previously received checkpoints have been stored.

In particular, the memory management entity 13 is adapted to determine which portions of the RAM coincide with a volatile RAM device 16 or a non-volatile RAM device 12, and in which type of RAM device 12, 16 the received checkpoints shall be stored.

Preferably, the checkpointing module 10 further comprises a short-term energy supply 17, which is configured to supply, upon a power outage, energy for a transfer of any stored checkpoints from the number of volatile random access memory devices 16 to the number of non-volatile random access memory devices 12.

Advantageously, when given a short-term energy supply 17, any received checkpoints cached in volatile RAM devices 16 may, upon a power outage, be transferred to non-volatile RAM devices 12 in a controlled manner.

Preferably, the checkpointing module 10 further comprises a power management entity 18, which is configured to disable the source coding of a subset of the received checkpoints upon a power outage.

Advantageously, the power management entity 18 may, upon a power outage, deactivate source coding for a subset, i.e. one or more, of the received checkpoints that were temporarily cached in the volatile RAM devices 16. This may ensure sufficiency of energy reserves of the short-term energy supply 17 for a controlled transfer of these checkpoints to the non-volatile RAM devices 12.

In particular, the power management entity 18 is adapted to determine how much energy and checkpoint data is available, and how much energy is consumed per source-coded unit of data. This way, the power management entity 18 may decide how many of the cached checkpoints can be source coded. Given additional information on the importance of individual checkpoints, source coding of individual cached checkpoints can be prioritized as well.

Preferably, the interconnect interface 11 is further configured to receive a request for a stored checkpoint from the at least one compute module 52 (see FIG. 5), wherein the memory management entity 13 is further configured to look up the assigned storage location of the stored checkpoint for which the request is received, wherein the memory controller 14 is further configured to retrieve the stored checkpoint from its assigned storage location, and wherein the interconnect interface 11 is configured to deliver the stored checkpoint to the at least one compute module 52 (see FIG. 5).

Advantageously, restoral and restart of virtual machines or compute processes on requesting compute modules 52 (see FIG. 5) is enabled.

Furthermore, the same mechanism may also be applied for dynamic setup of, or load sharing among compute modules 52 (see FIG. 5) in parallel computing environments.

In particular, a request for a stored checkpoint may be issued by the at least one compute module 52 as a result of its own failure and restart. It may also be conceivable that the request is issued by another compute module 52, which is equivalent to the one of which the checkpoint was made. Furthermore, it may also be possible for a compute module 52 to request a stored checkpoint if it is adapted to determine that one of its virtual machines or compute processes is stalled, e.g. using a monitoring entity such as a "watchdog timer".

In particular, the memory management entity 13 is adapted to determine, based on its records, the assigned storage location of the relevant stored checkpoint, the memory controller 14 is adapted to read the assigned storage location determined by the memory management entity 13, and the interconnect interface 11 is adapted to reply to the request of the requesting compute module 52 by transmission of the requested checkpoint, as read by the memory controller 14.

Preferably, the checkpointing module 10 further comprises an external storage interface 19, which is configured to page in and out stored checkpoints to and from block access storage.

Advantageously, the external storage interface 19 is adapted to connect its checkpoint module 10 with block access storage, i.e. devices that are adapted to store data in blocks, for example, byte sequences of fixed size, on media such as magnetic tape, rotating disks and/or solid-state disks. This way, these devices may be used as permanent storage in addition to the non-volatile RAM devices 12, relieving the non-volatile RAM devices 12 from storing checkpoints or reference checkpoints of virtual machines or compute processes which are not currently used.

Preferably, the memory controller 14 is further configured to overwrite stored checkpoints at their assigned storage locations with more recently received checkpoints from the at least one compute module 52 (of FIG. 5).

Advantageously, overwriting stored checkpoints saves memory space in the non-volatile RAM devices 12 by re-using the memory space of their less recent version, since for most cases only the most recent checkpoint may be of interest. In particular, overwriting may be achieved in a physical sense by re-using the assigned storage location of the less recent checkpoint, or in a logical sense by first storing the more recent checkpoint at a newly assigned storage location and then deleting the less recent one at its present storage location.

Figure 3:
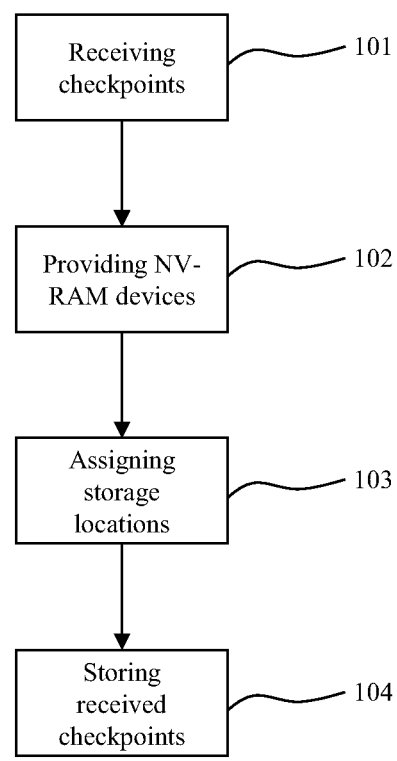
FIG. 3 shows a first embodiment of a sequence of method steps for storing checkpoints.

FIG. 3 shows a first embodiment of a sequence of method steps for storing checkpoints.

The method for storing checkpoints of FIG. 3 comprises the following steps:

In a first step 101, checkpoints from at least one compute module 52 (see FIG. 5) are received.

In a second step 102, a number of non-volatile random access memory devices 12 is provided, which is configured to store the received checkpoints.

In a third step 103, storage locations for the received checkpoints in the number of non-volatile random access memory devices 12 are assigned.

In a fourth step 104, the received checkpoints are stored at the assigned storage locations.

Advantageously, the method for storing checkpoints of FIG. 3 is adapted to establish and maintain high availability of virtual machines or compute processes in physical server infrastructures with lots of compute modules 52 of FIG. 5, which may component-wise be based on consumer or embedded parts.

Figure 4:
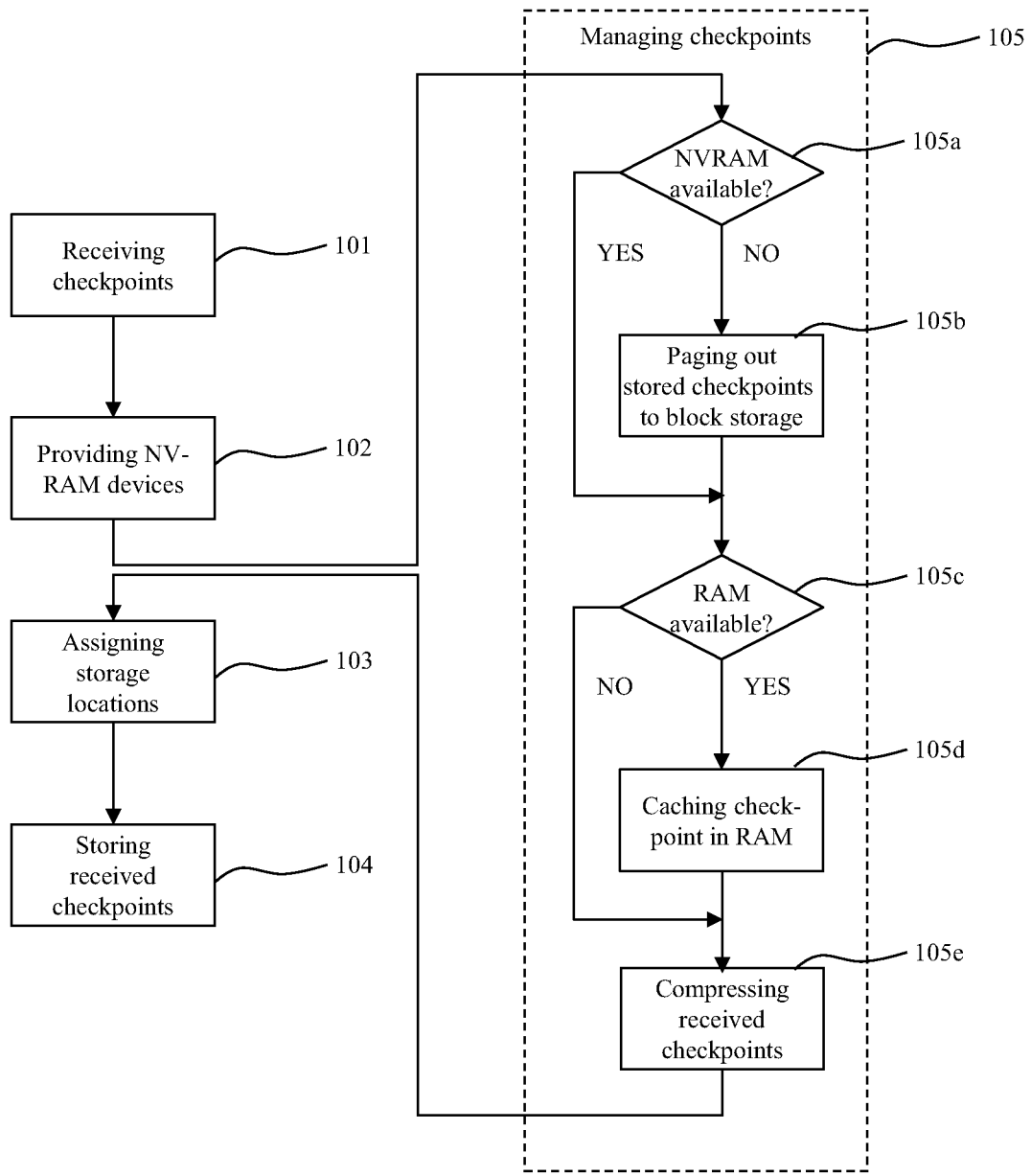
FIG. 4 shows a second embodiment of a sequence of method steps for storing checkpoints.

FIG. 4 shows a second embodiment of a sequence of method steps for storing checkpoints.

Preferably, the method for storing checkpoints of FIG. 4 comprises all the method steps 101, 102, 103, 104 of FIG. 3, and additionally a fifth method step 105 which is inserted in between the previously described second and third method steps 102, 103.

In the fifth step 105, the received checkpoints as well as the stored checkpoints are managed concerning their storage location in a memory hierarchy consisting of non-volatile RAM devices 12, volatile RAM devices 16 if available, and block access storage.

In particular, the fifth method step 105 assumes that block access storage connected via an external storage interface 19 is available, establishing the possibility to page out checkpoints stored in non-volatile RAM devices 12 to block access storage if needed. Furthermore, the fifth method step 105 is adapted to process the received checkpoints in several sub-steps 105*a*, 105*b*, 105*c*, 105*d*, and 105*e*.

In the first sub-step 105*a*, the availability of free memory space in non-volatile RAM devices 12 is determined.

Advantageously, if there is a lack of free memory space in the non-volatile RAM devices 12, the second sub-step 105*b* may be executed.

In the second sub-step 105*b*, one or more stored checkpoints are paged out from the non-volatile RAM devices 12 to block access storage. Then, the execution proceeds at the third sub-step 105*c*.

In the third sub-step 105*c*, the availability of free memory space in the volatile RAM devices 16 is examined.

Advantageously, only if volatile RAM devices 16 are available, the fourth sub-step 105*d* is performed, in which received checkpoints are cached, i.e. temporarily stored, in the available volatile RAM devices 16.

Advantageously, this allows for completion of the protocol sequence dealing with reception of checkpoints by the checkpointing module 10 in the communication protocol between the checkpointing module 10 and a compute module 52 (see FIG. 5). Thus, the respective compute module 52 may address itself to the substance of its role again.

Then, the execution proceeds at the fifth sub-step 105*e*, in which the received checkpoints are source coded, except for the case in which source coding is selectively or generally deactivated by a power management entity 18 upon power outage.

FIG. 5 shows a schematic block diagram of an embodiment of a microserver 50 including a checkpointing module 10 for storing checkpoints.

Preferably, the microserver 50 comprises a base node 51 including a plurality of module slots for receiving different modules 10, 52, at least one compute module 52 for providing checkpoints, and at least one checkpointing module 10 for storing checkpoints. The checkpointing module 10 may be embodied as shown in FIG. 1 or in FIG. 2.

In particular, the base node 51 of the microserver 50 may comprise all the functionality needed by every module 10, 52 included in the microserver 50. For example, this applies to housing, cooling and power supply functions.

In particular, the different modules 10, 52 may provide different functionality. A compute module 52 (see FIG. 5) specializes in computing, whereas a checkpointing module 10 is dedicated to checkpointing of virtual machines or compute processes being executed by one or more compute modules 52. Other types of modules are conceivable as well.

Advantageously, this functional split between the different modules 10, 52 results in the possibility to optimize checkpointing modules 10 for their functional purpose and to have them serving several compute modules 52 (see FIG. 5) at a time. Hence, economies-of-scale factors can be made use of in the dimensioning of a checkpointing module 10. That is to say that, for example, a source coding entity 15 deployed in the checkpointing module 10 may be more adequately loaded if it serves several compute modules 52 at a time, and that a more powerful dimensioning of the source coding entity 15 may make the deployment of another checkpointing module 10 dispensable. The same effect may apply to any other type of specialized module deployed in a microserver 50, which serves a plurality of other modules, e.g. compute modules 52.

Advantageously, the functional split may also simplify functional modification of the microserver 50, for example by exchanging the compute modules 52 as next generation processors based on ever smaller structures become available. Furthermore, changing the mix of the different modules 10, 52 included in the microserver 50 as needed may allow changing its functionality qualitatively as well.

Figure 6:
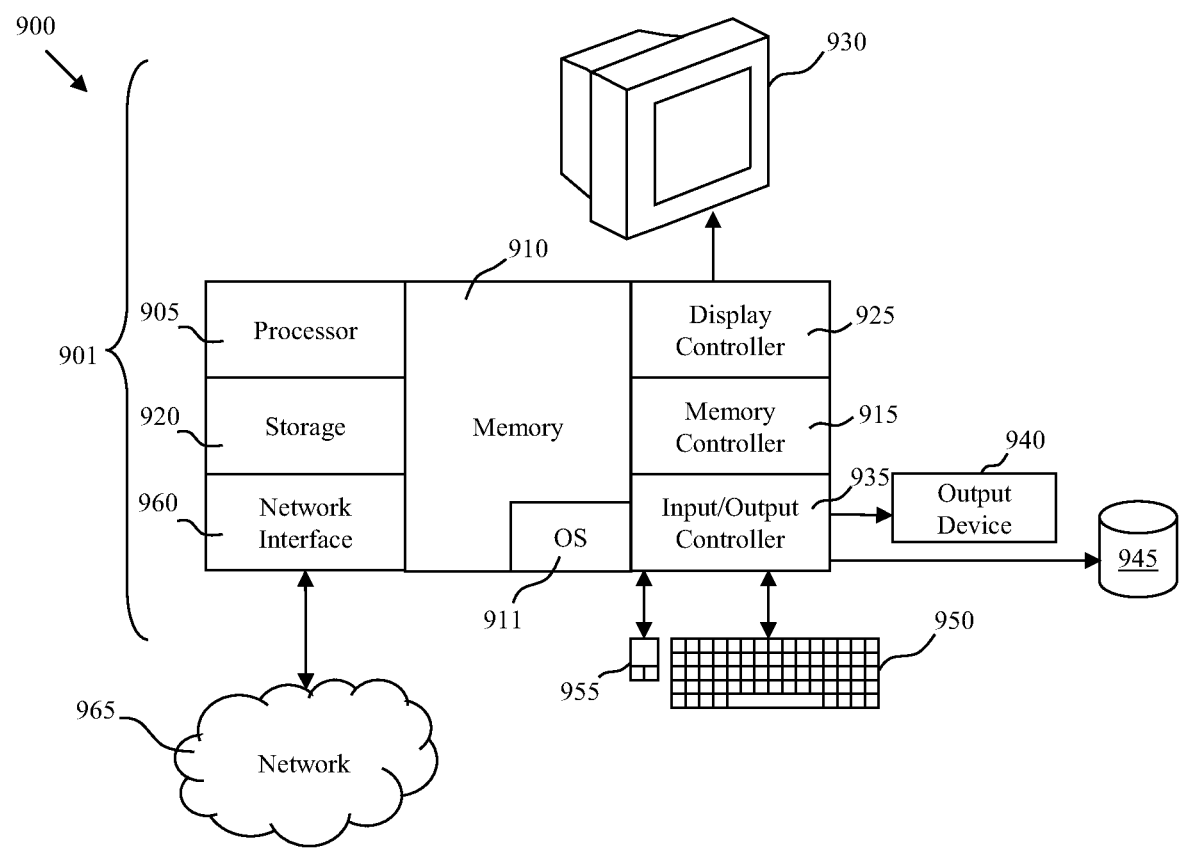
FIG. 6 shows a schematic diagram of an embodiment of a system adapted for storing checkpoints.

FIG. 6 shows a schematic diagram of an embodiment of a system 900 adapted for storing checkpoints.

Computerized devices may be suitably designed for implementing embodiments of the present invention as described herein. In that respect, it may be appreciated that the methods described herein are largely non-interactive and automated. In exemplary embodiments, the methods described herein may be implemented either in an interactive, partly-interactive or non-interactive system. The methods described herein may be implemented in software (e.g., firmware), hardware, or a combination thereof. In exemplary embodiments, the methods described herein are implemented in software, as an executable program, the latter executed by suitable digital processing devices. In further exemplary embodiments, at least one step or all steps of above methods of FIG. 3 or 4 may be implemented in software, as an executable program, the latter executed by suitable digital processing devices. More generally, embodiments of the present invention may be implemented wherein general-purpose digital computers, such as personal computers, workstations, etc., are used.

For instance, the system 900 depicted in FIG. 6 schematically represents a computerized unit 901, e.g., a general-purpose computer. In exemplary embodiments, in terms of hardware architecture, as shown in FIG. 6, the unit 901 includes a processor 905, memory 910 coupled to a memory controller 915, and one or more input and/or output (I/O) devices 940, 945, 950, 955 (or peripherals) that are communicatively coupled via a local input/output controller 935. Further, the input/output controller 935 may be, but is not limited to, one or more buses or other wired or wireless connections, as is known in the art. The input/output controller 935 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 905 is a hardware device for executing software, particularly that stored in memory 910. The processor 905 may be any custom made or commercially available processor, a central processing unit (CPU), an auxiliary processor among several processors associated with the computer 901, a semiconductor based microprocessor (in the form of a microchip or chip set), or generally any device for executing software instructions.

The memory 910 may include any one or combination of volatile memory elements (e.g., random access memory) and nonvolatile memory elements. Moreover, the memory 910 may incorporate electronic, magnetic, optical, and/or other types of storage media. Note that the memory 910 may have a distributed architecture, where various components are situated remote from one another, but may be accessed by the processor 905.

The software in memory 910 may include one or more separate programs, each of which comprises an ordered listing of executable instructions for implementing logical functions. In the example of FIG. 6, the software in the memory 910 includes methods described herein in accordance with exemplary embodiments and a suitable operating system (OS) 911. The OS 911 essentially controls the execution of other computer programs, such as the methods as described herein (e.g., FIGS. 3, 4), and provides scheduling, input-output control, file and data management, memory management, and communication control and related services. For example, the interface 1 may be embodied in the OS 911.

The methods described herein may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 910, so as to operate properly in connection with the OS 911. Furthermore, the methods may be written as an object oriented programming language, which has classes of data and methods, or a procedure programming language, which has routines, subroutines, and/or functions.

Possibly, a conventional keyboard 950 and mouse 955 may be coupled to the input/output controller 935. Other I/O devices 940-955 may include sensors (especially in the case of network elements), i.e., hardware devices that produce a measurable response to a change in a physical condition like temperature or pressure (physical data to be monitored). Typically, the analog signal produced by the sensors is digitized by an analog-to-digital converter and sent to controllers 935 for further processing. Sensor nodes are ideally small, consume low energy, are autonomous, and operate unattended.

In addition, the I/O devices 940-955 may further include devices that communicate both inputs and outputs. The system 900 may further include a display controller 925 coupled to a display 930. In exemplary embodiments, the system 900 may further include a network interface or transceiver 960 for coupling to a network 965.

The network 965 transmits and receives data between the unit 901 and external systems. The network 965 is possibly implemented in a wireless fashion, e.g., using wireless protocols and technologies, such as WiFi, WiMax, etc. The network 965 may be a fixed wireless network, a wireless local area network (LAN), a wireless wide area network (WAN) a personal area network (PAN), a virtual private network (VPN), intranet or other suitable network system and includes equipment for receiving and transmitting signals.

The network 965 may also be an IP-based network for communication between the unit 901 and any external server, client and the like via a broadband connection. In exemplary embodiments, network 965 may be a managed IP network administered by a service provider. Besides, the network 965 may be a packet-switched network such as a LAN, WAN, Internet network, etc.

If the unit 901 is a PC, workstation, intelligent device or the like, the software in the memory 910 may further include a basic input output system (BIOS). The BIOS is stored in ROM so that the BIOS may be executed when the computer 901 is activated.

When the unit 901 is in operation, the processor 905 is configured to execute software stored within the memory 910, to communicate data to and from the memory 910, and to generally control operations of the computer 901 pursuant to the software. The methods described herein and the OS 911, in whole or in part are read by the processor 905, typically buffered within the processor 905, and then executed. When the methods described herein (e.g. with reference to FIGS. 3, 4) are implemented in software, the methods may be stored on any computer readable medium, such as storage 920, for use by or in connection with any computer related system or method.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects. Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the unit 901, partly thereon, partly on a unit 901 and another unit 901, similar or not.

Aspects of the present invention are described above with reference to flowchart illustrations and/or block diagrams of methods, apparatus (systems) and computer program products according to embodiments of the invention. It will be understood that each block of the flowchart illustrations and/or block diagrams may be implemented by one or more computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved and algorithm optimization. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

More generally, while the present invention has been described with reference to certain embodiments, it will be understood by those skilled in the art that various changes may be made and equivalents may be substituted without departing from the scope of the present invention. In addition, many modifications may be made to adapt a particular situation to the teachings of the present invention without departing from its scope. Therefore, it is intended that the present invention not be limited to the particular embodiments disclosed, but that the present invention will include all embodiments falling within the scope of the appended claims.

REFERENCE NUMERALS

- 10 checkpointing module
- 11 interconnect interface
- 12 non-volatile Random Access Memory device
- 13 memory management entity
- 14 memory controller
- 15 source coding entity
- 16 volatile Random Access Memory device
- 17 short-term energy supply
- 18 power management entity
- 19 external storage interface
- 50 microserver
- 51 base node
- 52 compute module
- 101-105 method steps
- 900 system
- 901 computerized unit
- 905 processor
- 910 memory
- 911 operating system (OS)
- 915 memory controller
- 920 storage
- 925 display controller
- 940 display
- 945, 950, 955 input and/or output (I/O) devices
- 935 local input/output controller
- 950 keyboard
- 955 mouse
- 960 network interface or transceiver
- 965 network

REFERENCES

[1] R. P. Luijten and A. Doering, The DOME embedded 64 bit microserver demonstrator, In ICICDT, pages 203-206, 2013.
[2] K.-Y. Hou, K. G. Shin, Y. Turner and S. Singhal, Tradeoffs in Compressing Virtual Machine Checkpoints, In Proc. of 7th International Workshop on Virtualization Technologies in Distributed Computing (VTDC), pages 41-48, 2013.
[3] P. Sobe. A Study of Roll-Forward Recovery from Faults among Communicating Processes, Tech. Report FI 98/02, Institute of Computer Systems, Technische Universität Dresden, 1998.
[4] A. Akel, A. M. Caulfield, T. I. Molloy, R. K. Gupta and S. Swanson, Onyx: A Prototype Phase Change Memory Storage Array.

The invention claimed is:

1. A checkpointing module for storing checkpoints, the checkpointing module comprising:
an interconnect interface configured to receive one or more checkpoints from at least one compute module, wherein the one or more checkpoints were generated by the at least one compute module as part of a checkpointing operation performed by the at least one compute module and comprise a consistent data set indicating a software state of the at least one compute module, and wherein the at least one compute module is external to the checkpointing module;
one or more volatile random access memory devices configured to temporarily store the one or more checkpoints generated by the at least one compute module;
one or more non-volatile random access memory devices configured to receive the one or more checkpoints generated by the at least one compute module for storage therein;
a memory management entity configured to
assign temporary storage locations for the one or more checkpoints in the one or more volatile random access memory devices, and
assign storage locations for the one or more checkpoints in the one or more non-volatile random access memory devices;
a memory controller configured to
store the one or more checkpoints at one or more of the assigned storage locations within the one or more volatile random access memory devices; and
a source coding entity configured to determine if at least one reference checkpoint is available for each of the received checkpoints, wherein
in response to determining that at least one reference checkpoint is available, the source coding entity further configured to perform data differencing between the at least one checkpoint of the one or more checkpoints and the at least one reference checkpoint while the at least one checkpoint is stored within the one or more volatile random access memory devices, and
in response to determining that at least one reference checkpoint is not available, the source coding entity further configured to perform data compression of the at least one checkpoint of the one or more checkpoints while the at least one checkpoint is stored within the one or more volatile random access memory devices,
wherein the memory controller is further configured to
determine that source coding of at least one of the one or more checkpoints stored within the one or more volatile random access memory devices has been completed, and
in response to the source coding having been completed, move the at least one of the one or more checkpoints to at least one of the assigned storage locations within the one or more non-volatile random access memory devices.

2. The checkpointing module of claim 1, wherein the one or more non-volatile random access memory devices comprise a phase change memory cell or a memristor cell.

3. The checkpointing module of claim 1, further comprising:
a source coding entity configured to perform source coding of the one or more checkpoints stored within the one or more volatile random access memory devices.

4. The checkpointing module of claim 3, wherein the source coding entity is configured to perform data differencing.

5. The checkpointing module of claim 4, wherein, upon presence of reference checkpoints for the one or more checkpoints, the source coding entity is configured to perform data differencing between the one or more checkpoints and the reference checkpoints while the one or more checkpoints are stored within the one or more volatile random access memory devices.

6. The checkpointing module of claim 3, wherein the source coding entity is configured to perform data compression.

7. The checkpointing module of claim 6, wherein, upon absence of reference checkpoints for the one or more checkpoints, the source coding entity is configured to perform data compression of the received one or more checkpoints while stored within the one or more volatile random access memory devices.

8. The checkpointing module of claim 1, further comprising:
a short-term energy supply configured to supply, upon a power outage, energy for a transfer of any stored checkpoints from the one or more volatile random access memory devices to the one or more of non-volatile random access memory devices.

9. The checkpointing module of claim 8, further comprising:
a power management entity configured to disable the source coding of a subset of the one or more checkpoints stored within the one or more volatile random access memory devices upon a power outage.

10. The checkpointing module of claim 1, wherein the interconnect interface is further configured to:
receive a request for a stored checkpoint from the at least one compute module,
wherein the memory management entity is further configured to look up the assigned storage location of the stored checkpoint for which the request is received,
wherein the memory controller is further configured to retrieve the stored checkpoint from its assigned storage location, and
wherein the interconnect interface is configured to deliver the stored checkpoint to the at least one compute module.

11. The checkpointing module of claim 1, further comprising:
an external storage interface configured to page in and out stored checkpoints to and from block access storage.

12. The checkpointing module of claim 1, wherein the memory controller is further configured to overwrite stored checkpoints at their assigned storage locations with more recently received one or more checkpoints from the at least one compute module.

13. A microserver comprising:
a base node comprising a plurality of module slots for receiving different modules;
at least one compute module for generating and providing one or more checkpoints, wherein the one or more checkpoints comprise a consistent data set indicating a software state of the at least one compute module; and
at least one checkpointing module for storing checkpoints, wherein the at least one compute module is external to the at least one checkpointing module, the checkpointing module comprising:
an interconnect interface configured to receive the one or more checkpoints from the at least one compute module;
one or more volatile random access memory devices configured to temporarily store the one or more checkpoints generated by the at least one compute module;
one or more non-volatile random access memory devices configured to receive the one or more checkpoints for storage therein;
a memory management entity configured to
assign temporary storage locations for the one or more checkpoints in the one or more volatile random access memory devices, and
assign storage locations for the received checkpoints in the one or more non-volatile random access memory devices;
a memory controller configured to store the one or more checkpoints at one or more of the assigned storage locations within the one or more volatile random access memory devices;
a source coding entity configured to determine if at least one reference checkpoint is available for each of the received checkpoints, wherein
in response to determining that at least one reference checkpoint is available, the source coding entity further configured to perform data differencing between the at least one checkpoint of the one or more checkpoints and the at least one reference checkpoint while the at least one checkpoint is stored within the one or more volatile random access memory devices, and
in response to determining that at least one reference checkpoint is not available, the source coding entity further configured to configured to perform data compression of the at least one checkpoint of the one or more checkpoints while the at least one checkpoint is stored within the one or more volatile random access memory devices,
wherein the memory controller is further configured to move the at least one checkpoint from the one or more volatile random access memory devices to at least one of the assigned storage locations within the one or more non-volatile random access memory devices in response to the source coding or the data compression having completed.

14. A method, with a checkpointing module of an information processing system, for storing checkpoints, the method comprising:
receiving one or more checkpoints from at least one compute module, wherein the one or more checkpoints were generated by the at least one compute module as part of a checkpointing operation performed by the at least one compute module and comprise a consistent data set indicating a software state of the at least one compute module, and wherein the at least one compute module is external to the at least one checkpointing module;
providing one or more volatile random access memory devices configured to temporarily store the one or more checkpoints generated by the at least one compute module for storage;
providing one or more non-volatile random access memory devices configured to store the one or more checkpoints generated by the at least one compute module;
assigning storage locations for the one or more checkpoints in the one or more volatile memory devices and the one or more non-volatile random access memory devices;
storing the one or more checkpoints at one or more of the assigned storage locations within the one or more volatile random access memory devices;

performing source coding on at least one of the one or more checkpoints stored at the one or more of the assigned storage locations within the one or more volatile random access memory devices, wherein performing the source coding comprises
  determining if at least one reference checkpoint is available for each of the received checkpoints,
  in response to determining that at least one reference checkpoint is available, the source coding entity further configured to perform data differencing between the at least one checkpoint of the one or more checkpoints and the at least one reference checkpoint while the at least one checkpoint is stored within the one or more volatile random access memory devices, and
  in response to determining that at least one reference checkpoint is not available, the source coding entity further configured to perform data compression of the at least one checkpoint of the one or more checkpoints while the at least one checkpoint is stored within the one or more volatile random access memory devices;
determining that the source coding has been completed for the at least one of the one or more checkpoints; and
in response to determining that the source coding has been completed, moving the at least one of the one or more checkpoints to at least one of the assigned storage locations within the one or more non-volatile memory devices.

15. The method of claim 14, further comprising:
upon presence of reference checkpoints for the one or more checkpoints, performing data differencing between the one or more checkpoints and the reference checkpoints while the one or more checkpoints are stored within the one or more volatile random access memory devices.

16. The method of claim 14, further comprising:
upon absence of reference checkpoints for the one or more checkpoints, performing data compression of the received one or more checkpoints while the one or more checkpoints are stored within the one or more volatile random access memory devices.

17. The method of claim 14, further comprising:
assigning temporary storage locations for the one or more checkpoints in one or more volatile random access memory devices.

18. The method of claim 14, further comprising:
receiving a request for a checkpoint stored within the one or more non-volatile random access memory devices from the at least one compute module;
looking up the assigned storage location of the stored checkpoint for which the request is received;
retrieving the stored checkpoint from its assigned storage location; and
delivering the stored checkpoint to the at least one compute module.

19. The method of claim 18, further comprising:
overwriting stored checkpoints at their assigned storage locations with more recently received one or more checkpoints from the at least one compute module.

20. The method of claim 14, wherein performing the source coding comprises:
determining an amount of available energy reserves of a power supply;
determining an amount of checkpoint data stored within the one or more volatile random access memory devices;
determining an amount of energy consumed per source-coded unit of data based on the determined amount of checkpoint data stored within the one or more volatile random access memory devices; and
performing the source coding according to a prioritization of the at least one of the one or more checkpoints, wherein the prioritization is determined based on the amount of available energy reserves of the power supply and the determined amount of energy consumed per source-coded unit of data.

* * * * *